Figure 1:
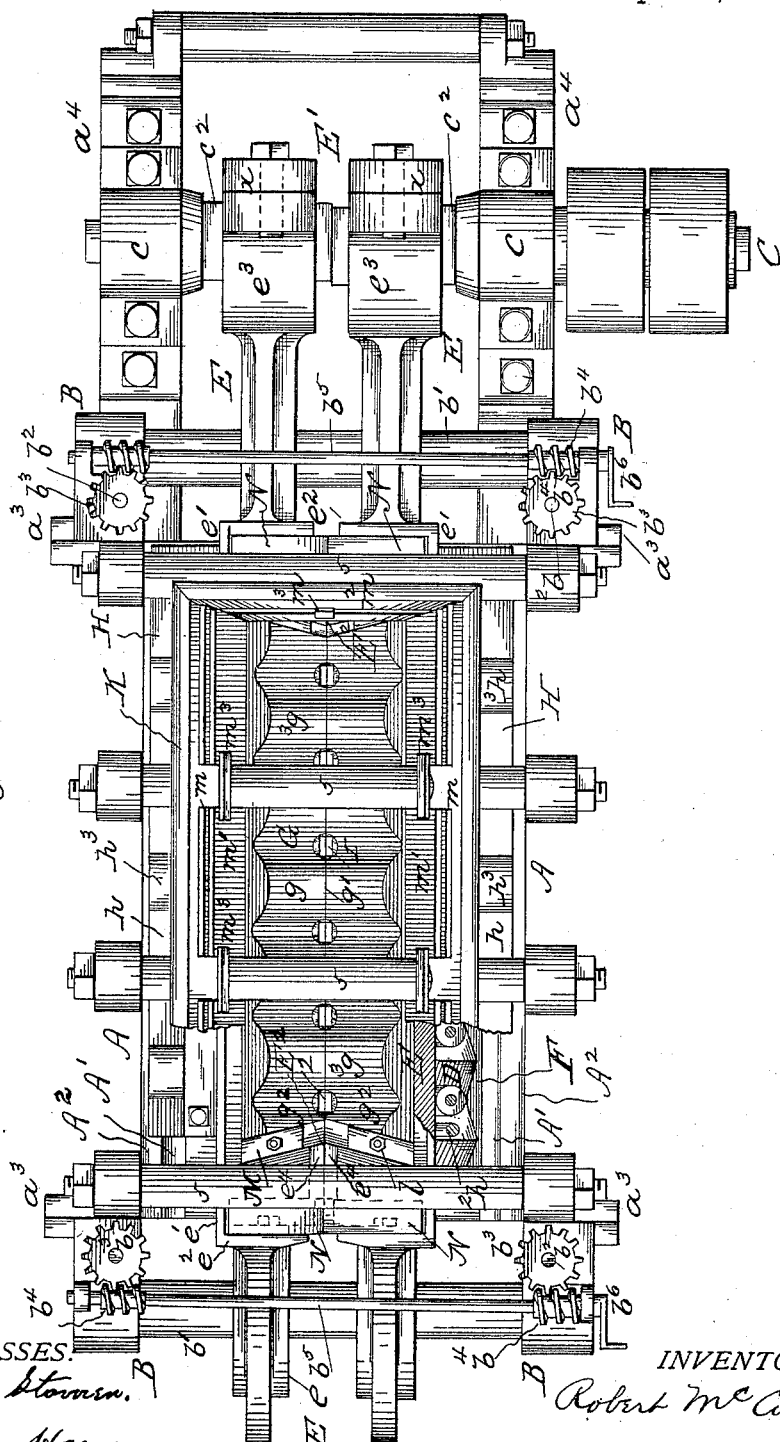

(No Model.) 6 Sheets—Sheet 1.

R. McCULLY.
CRUSHER AND PULVERIZER.

No. 458,638. Patented Sept. 1, 1891.

WITNESSES:
R. H. Van Stavoren.
Wm. Van Horn

INVENTOR,
Robert McCully
By S. J. Van Stavoren
ATTORNEY.

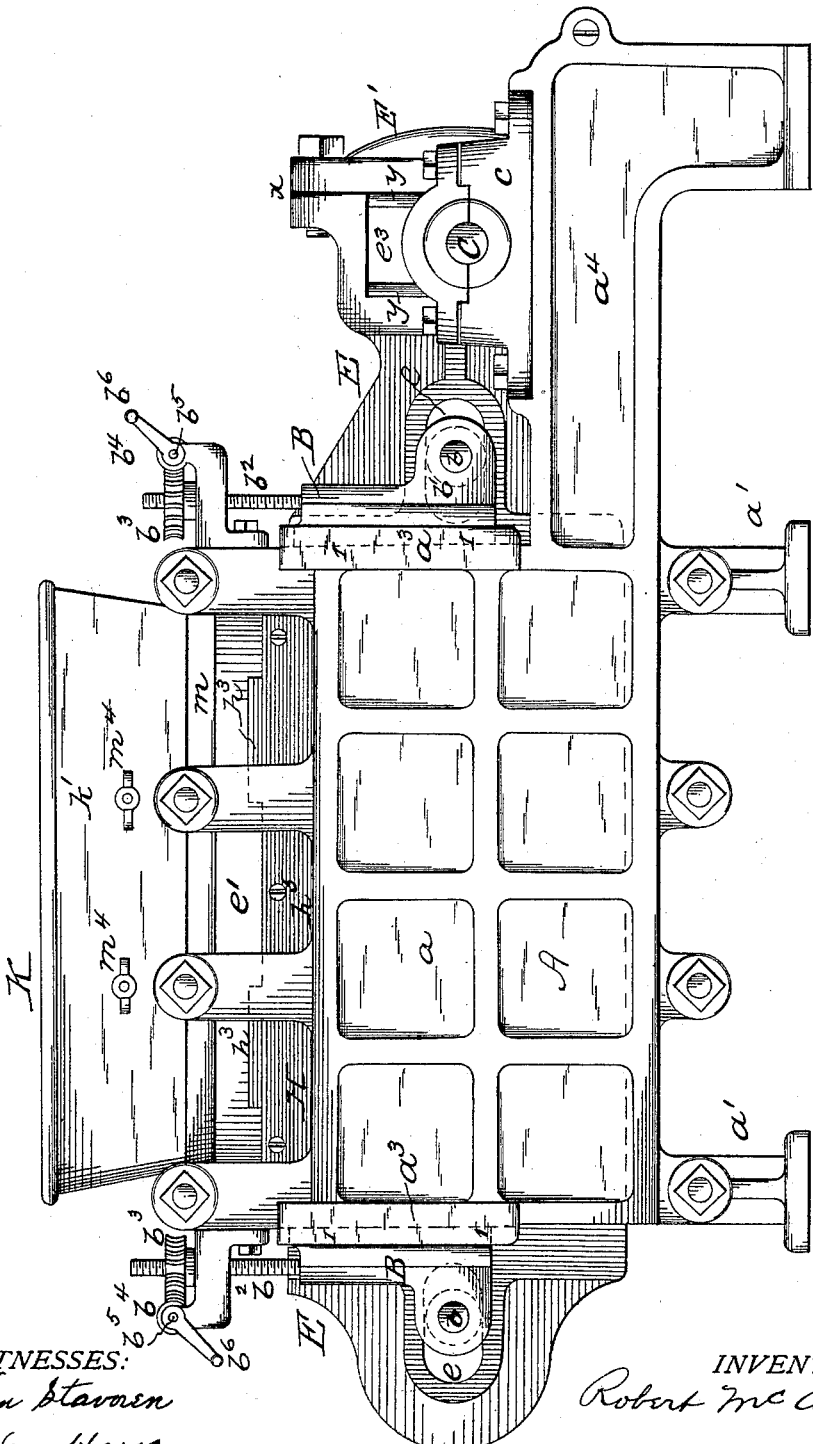

(No Model.) 6 Sheets—Sheet 3.
R. McCULLY.
CRUSHER AND PULVERIZER.
No. 458,638. Patented Sept. 1, 1891.
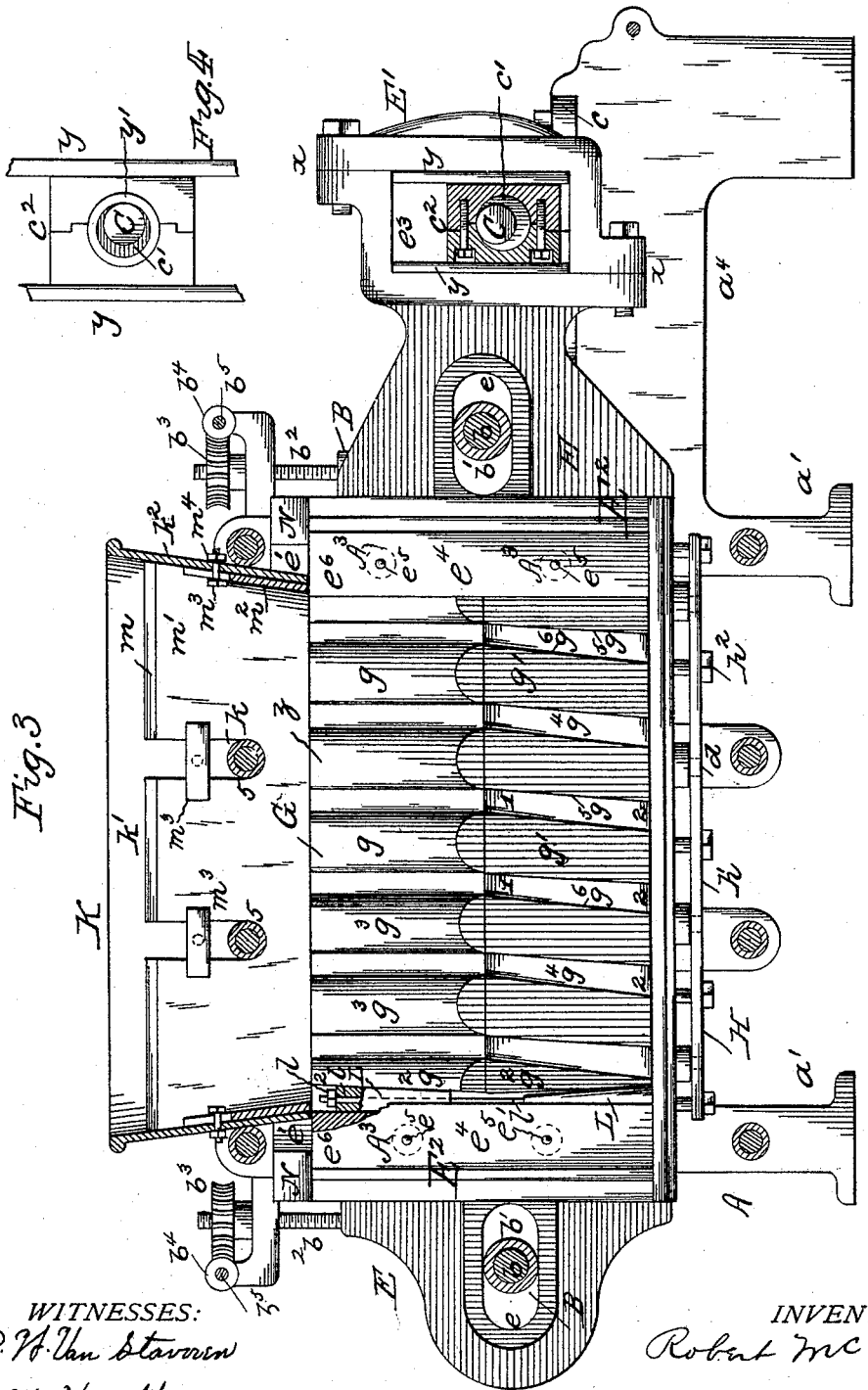
WITNESSES:
INVENTOR,
Robert McCully
By S. J. Van Stavoren
ATTORNEY.

(No Model.) 6 Sheets—Sheet 4.
R. McCULLY.
CRUSHER AND PULVERIZER.
No. 458,638. Patented Sept. 1, 1891.
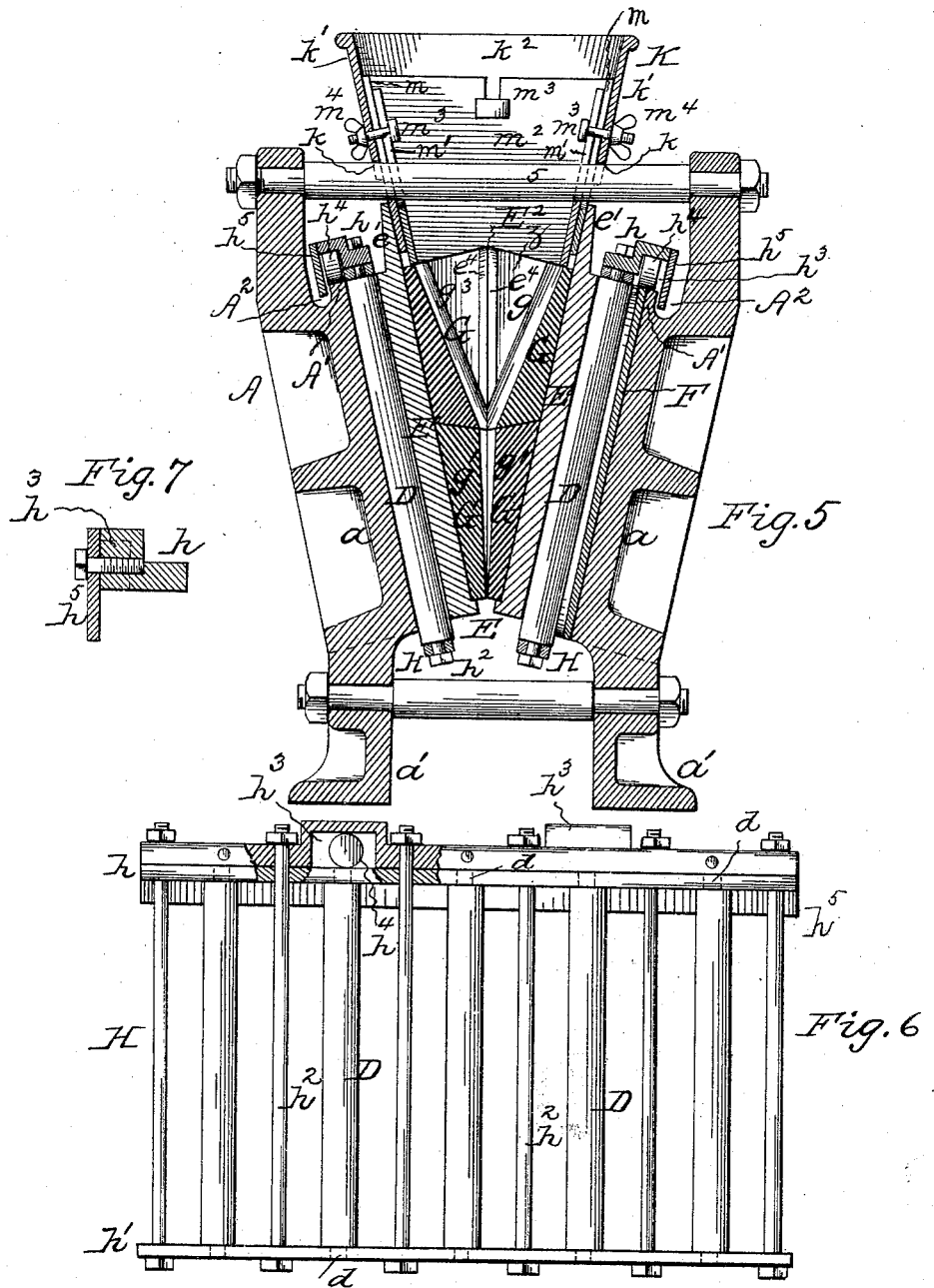

(No Model.) 6 Sheets—Sheet 5.
R. McCULLY.
CRUSHER AND PULVERIZER.
No. 458,638. Patented Sept. 1, 1891.
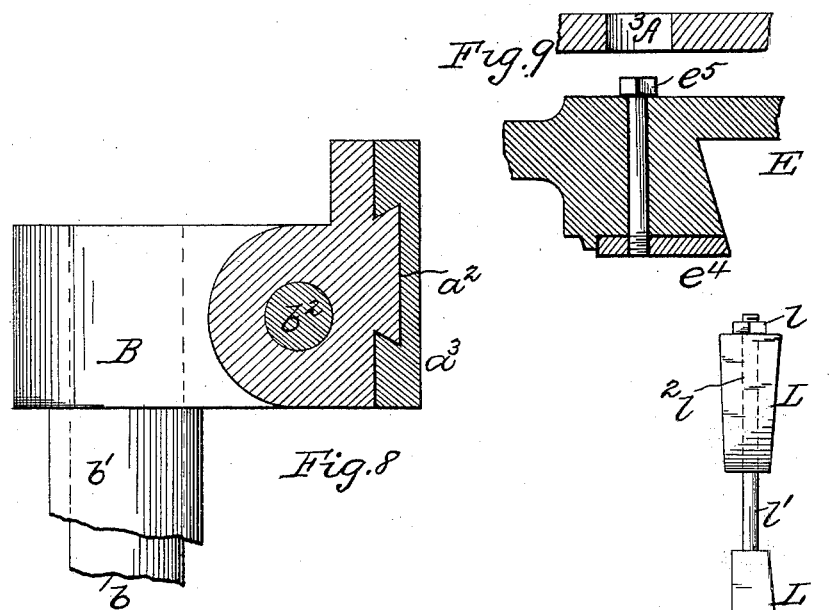
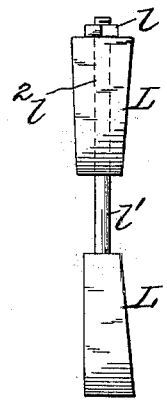
Fig.12
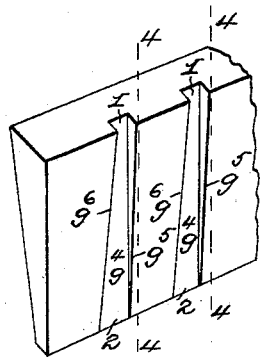
Fig.10
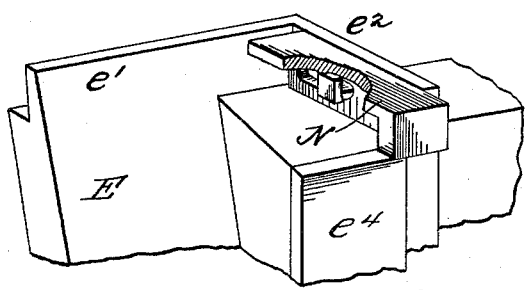
Fig.11
WITNESSES:
R. N. Van Stoorsen
Wm Vanstorn
INVENTOR,
Robert McCully
By S. J. Vanstavoren
ATTORNEY.

(No Model.) 6 Sheets—Sheet 6.
R. McCULLY.
CRUSHER AND PULVERIZER.
No. 458,638. Patented Sept. 1, 1891.
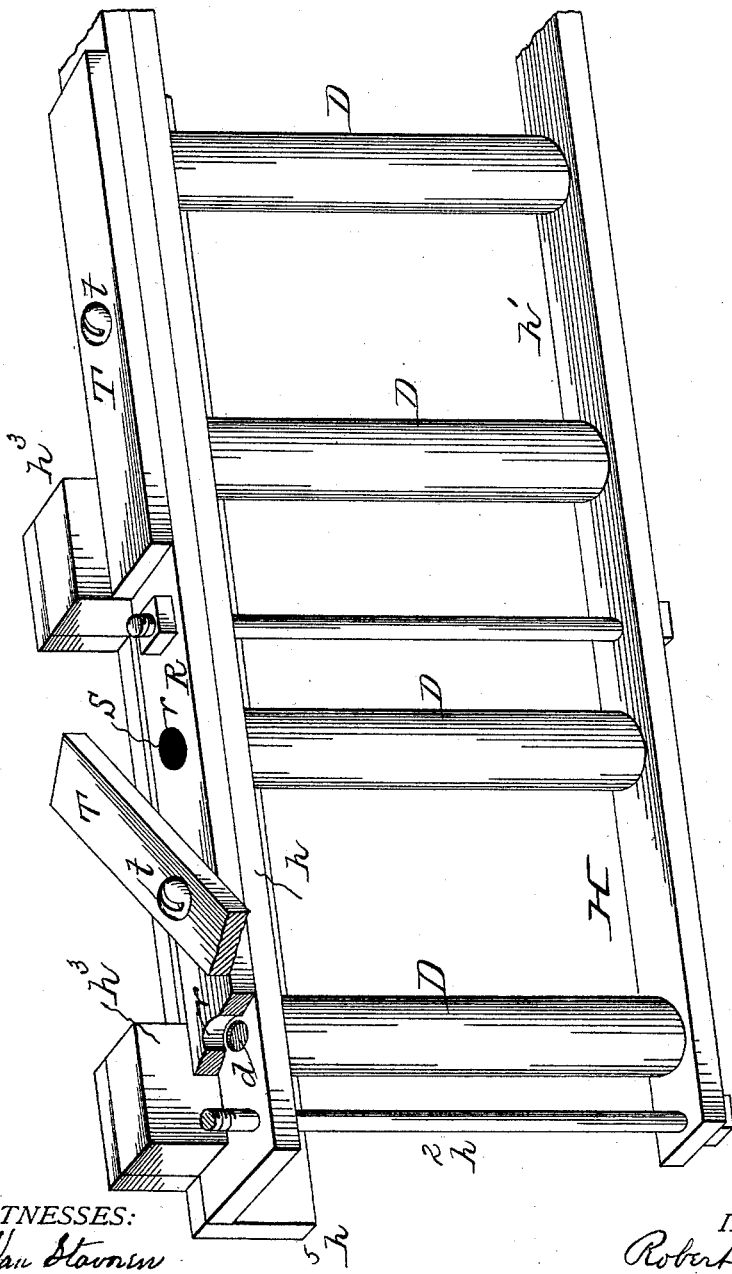
WITNESSES:
INVENTOR,
Robert McCully
By S. J. Van Stavoren
ATTORNEY.

UNITED STATES PATENT OFFICE.

ROBERT McCULLY, OF PHILADELPHIA, PENNSYLVANIA.

CRUSHER AND PULVERIZER.

SPECIFICATION forming part of Letters Patent No. 458,638, dated September 1, 1891.

Application filed September 19, 1883. Renewed January 30, 1891. Serial No. 379,691. (No model.)

*To all whom it may concern:*

Be it known that I, ROBERT MCCULLY, a citizen of the United States, residing at Philadelphia, in the county of Philadelphia and State of Pennsylvania, have invented certain new and useful Improvements in Crushers and Pulverizers, of which the following is a specification, reference being had therein to the accompanying drawings, wherein—

Figure 1 is a plan, partly sectional, of an ore crusher and pulverizer embodying my invention. Fig. 2 is a side elevation thereof. Fig. 3 is a central longitudinal vertical section of same. Fig. 4 is a broken elevation of a detail modification. Fig. 5 is a transverse vertical section. Fig. 6 is a detail sectional elevation. Figs. 7, 8, and 9 are detail sections drawn to an enlarged scale. Figs. 10 and 11 are detail perspectives. Fig. 12 is a detail elevation, and Fig. 13 is a broken perspective of another detail modification drawn to an enlarged scale.

My invention has relation to that form of ore crushers and pulverizers for which United States Letters Patent were granted to me on the 15th day of May, 1883, No. 277,763, and has for its object to decrease the cost of manufacture and the expense of wear and tear and to increase the efficiency and durability of such machines by simplifying and improving the construction of their working parts and the adjusting mechanism therefor.

My invention accordingly consists of the novel combinations, construction, and arrangement of parts, as hereinafter described and claimed.

In the drawings, A A represent the housings or sides of the crusher and pulverizer adapted to be maintained in due transverse position relatively to one another by means of cross-bolts and set-tubes, as shown, or any other known devices may be substituted therefor. Said housings have converging or inwardly-inclining sides $a$ $a$, feet $a'$ $a'$, perpendicularly-arranged dovetail or other suitably-configured slots $a^2$ in their ends $a^3$ $a^3$, as indicated by dotted lines 1 1, Fig. 2, and more plainly shown in the detail cross-section of one of said ends $a^3$, Fig. 8, in which slide the frames or brackets B B, and projections or standards $a^4$ $a^4$, supporting removable pedestals or bearings $c$ $c$ for the driving-shaft C.

The sliding frames B B have bearings or cross-bars $b$ $b$, upon which are mounted rollers $b'$ $b'$, passing through elongated openings $e$ $e$ in jaws E E near their ends to form supports or anti-friction roller-bearings for said jaws to slide upon as they are moved to and fro. These jaws not only have end-bearings upon the cross-bars $b$ $b$ or their rollers $b'$ $b'$, but also have a longitudinal bearing or rest upon the anti-friction rollers D D, suitably supported, as hereinafter described, upon the housings A, so that as the jaws E E are reciprocated the rollers D D are moved to and fro by the weight of the former to decrease the working friction of the same. These rollers D D are interposed between the housings A and the jaws E E, or between the latter and the double-inclined plates F, when used, to impart the transverse reciprocating motion to either of said jaws, said plates being plainly shown in Figs. 1 and 5.

To the frames B B are suitably secured the adjusting-screws $b^2$ $b^2$, which are provided with worm-wheels $b^3$ $b^3$ in gear with the worms $b^4$ $b^4$, mounted or formed on shafts $b^5$ $b^5$, so that by turning the latter in the proper direction the frames B B are slid up and down in the slots $a^2$ to raise or lower the jaws E E. As the latter descend the inclination of the anti-friction rolls D causes the working-faces G of the jaws to approach each other and take up their wear. As the jaws ascend their working-faces G separate or recede from one another, the extent of such separation being regulated, as desired, to suit the fineness of the feed and determine the degree of pulverization of the material passing through the machine. Such adjustments, it will be noticed, are made by merely turning the shafts $b^5$, thereby avoiding the necessity of moving the housings or disturbing their screw connections to effect such adjustments, as described in my former patent. The shafts $b^5$ may be turned by means of winches $b^6$ or hand-wheels, or other suitable means may be used therefor.

The rollers D D are provided with journals $d$ $d$, which have their bearings in the bars $h$ $h'$, connected together by bolts $h^2$ to form a frame H for said rollers. The bars $h$ may be in one piece, with the openings or bearings for the journals $d$ bored partially through the same, and be provided with recesses or chambers $h^3$ to receive anti-friction rollers $h^4$; or said bars may consist of two pieces or sections, as shown, one of them having the journal-bearings formed therein and the other provided with the recesses $h^3$, the whole being secured by the bolts $h^2$, as illustrated. (See Fig. 6.) The rollers $h^4$ ride or travel upon the upper edges A′ of the housings A, as plainly indicated in Fig. 5, to form anti-friction roller-supports for frame H to travel upon as it and the rolls D are moved to and fro by the reciprocation of the jaws E. The above-described construction of the frame H for rolls D therefore not only affords an anti-friction roller-support for the jaws to work against, but also provides a like support for said frame H.

The rollers $h^4$ are maintained in position within the recesses $h^3$ and upon the seats A′ by means of depending plates $h^5$, screwed to the bars $h$, as shown in Figs. 2 and 7. Said plates enter grooves $A^2$, formed in the housings below and adjacent to the seats A′, and thereby subserve the additional purpose of guards or flanges for excluding dust or pulverized ore, &c., from the seats A′, anti-friction rollers $h^4$, rolls D, and their journals.

The jaws E are provided on their upper edges with projecting flanges or ribs $e'$ to form supports for the hopper K, as shown in Fig. 5. Said flanges extend across the top of the jaw, as indicated at $e^2$, Figs. 1 and 11, for a purpose to be hereinafter described. At the forward ends of said jaws are yokes $e^3$ $e^3$ for the reception of sliding journal-boxes $c^2$, surrounding the eccentrics $c'$, formed on or secured to shaft C. The yokes $e^3$ are parted at $x$ $x$ to provide removable right-angled or L-shaped configured heads or caps E′ for the jaws E, so that when said caps are unscrewed and taken off of the jaws they may be readily and conveniently removed from the machine for repairs, renewal of their working-faces, or otherwise without disturbing the shaft C or its bearings or the driving eccentrics and boxes mounted thereon.

The sliding boxes $c^2$ may be made in two parts and screwed together as indicated, or be otherwise constructed as desired.

The sides of the yokes are preferably provided with steel or hardened face-plates $y$ $y$, screwed or fastened thereto in any suitable manner, so as to be removable therefrom, and, if desired, a like metallic sleeve $y'$ may be interposed between the eccentrics $c'$ and the boxes $c^2$. Such construction avoids undue wear of said boxes and eccentrics, and said plates and sleeves when worn are readily and inexpensively replaced, thereby effecting a considerable saving in cost of repairs and maintenance of the machine in proper working condition.

The meeting ends or edges $E^2$ of jaws E are provided with face-plates $e^4$, of steel or other hard metal, removably secured thereto by screws $e^5$. (See Fig. 3, or as more plainly shown in Fig. 9.) To afford ready access to said screws the housings may be formed with apertures $A^3$ in line therewith, for the passage of a socket or other wrench. When said plates wear, they are removed and replaced by new ones, or when the jaws are adjusted to take up the wear of their working-faces or separated to decrease the fineness of the feed said plates are removed and thinner or thicker ones substituted therefor, according as either the former or latter adjustment is made.

The working-faces G of the jaws are made in two sections $g$ $g'$, (see Figs. 3 and 5,) the former being the crushing and the latter the pulverizing faces; but, if desired, they may be made integrally with one another or be composed of more than two sections, though I prefer to make them as shown.

The vertical edges or surfaces $g^2$ of the ends of the working-faces $g$ $g'$ are reversely inclined, so that when the wedges L are interposed between said ends and the adjacent ends $e^6$ of the jaws the rotation or adjustment of the nuts $l$ causes said wedges to be drawn together or so adjusts them that they firmly hold the faces or sections $g$ $g'$ in position upon the jaws. The bar or rod $l'$, connecting the wedges, may be formed integrally with one of them or otherwise secured thereto, and it may pass through an opening $l^2$ in the opposite wedge, as shown in Figs. 3 and 12, or through a lug or projection formed thereon.

The crushing-faces $g$ are made up of alternate ribs and hollows, (see Fig. 1,) of any desired or suitable configuration, in cross-section, to form the corrugated or crushing surfaces $g^3$ $g^3$, which are parallel or of an equal width from top to bottom, to prevent clogging or choking of the ore in the hollows between the crushing-surfaces.

The pulverizing-faces are provided with vertically-arranged recesses or furrows $g^4$, which slant longitudinally or incline from the perpendicular, as shown in Fig. 3, to provide for a shear cut by the two cutting-edges $g^5$ $g^6$ of each furrow, when adjacent furrows of opposing jaws are reciprocated past one another. Said furrows are deeper at their upper parts or ingress openings 1 than at their lower parts or egress openings 2, the latter being flush with the outer surface of the faces $g'$ to prevent the escape of ore from the machine not yet thoroughly pulverized. Said furrows are also made wider at their bottoms than at their tops, or their cutting-edges $g^5$ $g^6$ diverge from above downwardly to prevent choking or clogging of the furrows by the ore fed thereto. Such described formation of said furrows is more plainly shown in Fig. 10, and they may be square or oblong in cross-section, as indicated, or otherwise suitably configured, as desired. So, too, instead of slanting their cutting-edges $g^5$, they may be perpendicularly arranged, as indicated by dotted lines 4 4, Fig. 10, the results in either case being the same.

The hopper K is of such dimensions and is so arranged that it incloses the flaring space or chamber $z$ between the working-faces $g$ $g$ of the jaws. It has recesses $k$ in its sides $k'$ to fit over the cross tubes or bolts 5, as shown. The latter thereby support the hopper and prevent it moving longitudinally. The ends $k^2$ of the hopper pass downwardly until they nearly meet or rest upon the upper edges of the jaws, as shown.

To cause the hopper to follow the jaws when they are lowered to take up the wear of their working-faces, or, in other words, to adjust the sides and ends of the hopper to the jaws, or vice versa, the former is provided with slotted side plates $m$ $m'$ and end plates $m^2$, (see more plainly in Fig. 5,) held in their adjusted positions by thumb or jam nuts and bolts $m^4$ $m^3$, respectively. As the projections $e'$ on the jaws are outside of plates $m$ of the hopper, it is not subject to or does not move with the transverse movement of the jaw or jaws, and as plates $m$ rest against these projections $e'$ when the jaws are together, lateral movement of the hopper is prevented by said flanges, so that the hopper is fixed or firmly held in position without the use of special fastening devices and can be readily removed from the machine when occasion demands.

To the transverse parts $e^2$ of projections $e'$ are secured slotted adjustable plates or guards N, (see Figs. 1 and 3,) which may be constructed and arranged as shown in Fig. 11. These plates are used to prevent the ore escaping from beneath the ends $k^2$ of the hopper falling off of the machine, said ore being thereby collected upon the top of the jaws, and may at suitable times be returned to the hopper.

The operation of the jaws E E is as follows: They are reciprocated longitudinally by the eccentrics $c'$, and at the same time are moved to and fro transversely by the rollers D D moving up and down the inclines on plate F, as fully set forth in my aforesaid patent.

I have herein shown both jaws E adapted to be longitudinally reciprocated and only one of them simultaneously moved transversely; but, if desired, one of them may be fixed or both be moved in the different directions and in the manner as fully described in my aforesaid Letters Patent. Again, while I have shown and described my invention in the form of a combined crusher and pulverizer, I do not limit myself thereto, as it may without any material change be used either as a crusher or a pulverizer.

To use the machine as a crusher only, the pulverizing-faces are taken out of the machine or dispensed with, and when employed as a pulverizer the crushing-faces may be removed from the machine, in which case the material to be pulverized is first broken or crushed in any desired way.

In Fig. 13 I have shown means secured to or formed on frame H to permit of the lubrication of the upper journals and bearings of the friction-rollers D, wherein the bar R has a series of holes $r$ in line with the journals $d$ and are larger in diameter than that of latter, as shown. The holes $r$ are designed to hold loose soapstone, graphite, or other ingredients possessing self-lubricating properties, (indicated at S,) or said ingredients may be mixed with oil or the latter alone used. Said holes $r$ therefore serve as oil or lubricant containing cups and are protected from dust or other foreign matter by movable covers T, pivoted at $t$ to bar R, which is secured to bar $h$ by the bolts $h^2$. As the frame H is moved to and fro the rotation of the rollers D causes the lubricant in cups $r$ to work down between and lubricate the bearings and journals of said rollers. The cups $r$ may periodically be refilled with the lubricant by simply moving the covers T to one side, as illustrated.

Instead of using the pivoted sectional covers T, they may all be in one piece or a sliding bar, with openings substituted therefor and so arranged that its openings can be made to move into and out of registration with the cups $r$ for purposes of filling and protection, as described.

I do not herein broadly claim the jaws having L-shaped yokes and caps, nor the worm and gear adjusting mechanism for the same, as they are shown in English Patent No. 3,718, as well as in other continental and foreign patents granted to myself, my present invention only including the same as part of the subject-matter of specific combinations not shown in said foreign patents.

What I claim is—

1. In a crushing and pulverizing machine, the combination of frame A, having removable pedestals or bearings $c$, driving-shaft C, eccentric $c'$, block $c^2$, and jaws E, having right-angled or L-shaped configured yokes $e^3$ and removable caps E', substantially as shown and described.

2. The housings A, having inclined sides $a$, seats or rails A', and grooves A$^2$, in combination with frames H, having anti-friction rollers D and $h^4$ and plates $h^5$, substantially as shown and described.

3. In a crusher and pulverizer, the combination of jaws E, driving mechanism therefor, housings or frame A, having rails A', and sliding frames H, having anti-friction rolls D between said jaws and housings, and anti-friction rolls $h^4$, riding on rails A', substantially as shown and described.

4. The anti-friction-roller frame H, comprising rollers D, bars $h$ $h'$, and connecting-bolts $h^2$, substantially as shown and described, and for the purpose set forth.

5. The anti-friction-roller frame H, comprising rollers D, bars $h$ $h'$, connecting-bolts $h^2$, the bar $h$, having recesses $h^3$, and anti-friction rollers $h^4$, substantially as and for the purpose set forth.

6. The anti-friction-roller frame H, comprising rollers D and $h^4$, bars $h$ $h'$, flange $h^5$, and connecting-bolts $h^2$, substantially as shown and described.

7. The anti-friction-roller frame H, comprising rollers D, bars $h$ and $h'$, the former having recesses $h^3$ and rollers $h^4$, the flange or plate $h^5$, and connecting-bolts $h^2$, substantially as shown and described.

8. In an ore crusher and pulverizer, the jaws E, having L-shaped yokes $e^3$ and caps E', facing-strips $y$, eccentric mechanism $c'\ c^2$, and driving-shaft C, substantially as and for the purpose set forth.

9. In a crusher and pulverizer as herein shown and described, the jaws E, having upwardly-projecting flanges $e'$, in combination with hopper K, having adjustable side and end plates $m'\ m^2$, substantially as shown and described.

10. In a crusher and pulverizer, the combination of the jaws E, having flanges $e'\ e^2$, the hopper K, and adjustable plates N, substantially as and for the purpose set forth.

11. The combination, with jaws E, of the upwardly-diverging working-faces G, composed of ribs or corrugations $g^3$, of equal width from top to bottom, and the perpendicular faces $g'$, with slanting or inclining recesses $g^4$, substantially as shown, and for the purpose set forth.

12. In combination with jaws E, the crushing-faces $g^3$, of equal width throughout, and the pulverizing-faces $g'$, having inclined slots or furrows which are deeper and narrower at their tops or points of beginning than at their bottoms, substantially as shown and described.

13. In combination with jaws E, the pulverizing-faces $g'$, having furrows $g^4$, which are deeper and narrower at their upper parts than at their lower ends, substantially as shown and described.

14. In a crusher and pulverizer, the combination of longitudinally-moving jaws E, crushing-faces G, having ribs or corrugations of equal width from top to bottom, pulverizing-faces $g'$, having slanting or inclined vertical recesses, and reversely-arranged locking-wedges L for said faces, substantially as shown and described.

15. In a crusher and pulverizer, the combination of jaws E, having compound working-faces G, and the plates $e^4$, screwed to the meeting ends of said jaws, substantially as shown and described.

16. In a crusher and pulverizer, the housings A, having openings $A^3$, in combination with jaws E, having working-faces G, plates $e^4$, and screws $e^5$, substantially as shown and described.

17. In combination with the housings A and jaws E, the hopper K, having sliding or adjustable side and end plates, substantially as shown and described.

18. In an ore crusher and pulverizer, the combination of the following elements: a supporting-frame, crushing-jaws provided with two working-faces, an anti-friction-roller frame for said jaws to work against, supporting-rollers for said frame, a dust guard or plate for said supporting-rollers, and mechanism for operating and adjusting said jaws, substantially as shown and described.

19. The frame H, having bar $h$, with bearings for the journals of the rollers D, lubricating cups or openings for said journals, and movable covers or caps for said cups, substantially as shown and described.

In testimony whereof I affix my signature in presence of two witnesses.

ROBERT McCULLY.

Witnesses:
S. J. VAN STAVOREN,
CHAS. F. VAN HORN.